(12) United States Patent
Dianov et al.

(10) Patent No.: US 6,539,136 B1
(45) Date of Patent: Mar. 25, 2003

(54) FIBER-OPTIC PRESSURE SENSOR, VARIANTS AND METHOD FOR PRODUCING A RESILIENT MEMBRANE

(75) Inventors: Evgeny Mikhailovich Dianov, Moscow (RU); Mikhail Ivanovich Belovolov, Moscow (RU); Mikhail Mikhailovich Bubnov, Moscow (RU); Sergei Lvovich Semenov, Mytischi (RU)

(73) Assignee: Nauchny Tsentr Volokonnoi Optiki PRI Institute Obschei Fiziki Rossiiskoi Adademii Nauk, Moscow (RU)

(*) Notice: Subject to any disclaimer, the term of this patent is extended or adjusted under 35 U.S.C. 154(b) by 0 days.

(21) Appl. No.: 09/719,834
(22) PCT Filed: Mar. 24, 1999
(86) PCT No.: PCT/RU99/00086
§ 371 (c)(1), (2), (4) Date: Dec. 18, 2000
(87) PCT Pub. No.: WO99/66299
PCT Pub. Date: Dec. 23, 1999

(30) Foreign Application Priority Data

Jun. 16, 1998 (RU) .......................................... 98111786

(51) Int. Cl.[7] ................................................ G02B 6/00
(52) U.S. Cl. .................................... 385/12; 250/227.11
(58) Field of Search ...................... 385/12, 13; 72/800; 250/227.11

(56) References Cited

FOREIGN PATENT DOCUMENTS

| DE | 3611852 | 10/1986 |
|---|---|---|
| SU | 1571449 | 6/1990 |
| SU | 1686321 | 10/1991 |

OTHER PUBLICATIONS

"Diaphragm size and sensitivity for fiber optic pressure sensors", Gang He, et al., SPIE Fiber Optic and Laser Sensors, IX (1991, vol. 1584, pp. 152–156 No Date.

"Extrinsic Fabry–Perot Optical Fiber Sensor", Kent A. Murphy, et al., 8th Optical Fiber Sensors Conference, Jan. 29–31, 1992, Monterey Marriot, CA, pp. 193–196, No Date.

*Primary Examiner*—Javid Nasri
(74) *Attorney, Agent, or Firm*—Banner & Witcoff, Ltd.

(57) ABSTRACT

The inventions relate to measurements of a hydrostatic and/or fast-changing pressure by optical means, and are suitable for aerodynamic investigations of aircraft and small spacecraft, in robotics, including small force micro-clamps, in remote pressure monitoring (in wells, vessels, cylinders), in medicine and medical and biological investigations, hydroacoustics, security systems. The object is to improve the sensitivity and enhance the temperature and vibration stability of a pressure sensor. The pressure sensor is a low Q-factor Fabry-Perot cavity/interferometer 6 at the end of a single-mode optical fiber 1 with the 4% Fresnel reflection from the silica glass/air interface. Another movable mirror of the cavity is formed by an end face 10 of a short (1–3 mm) optical fiber length 9 having a small inertial mass and inserted into the center of a flexible membrane 9 of 500–700 $\mu$m in diameter, tightly sealing a small air volume of about 1–3 mm$^3$ inside a second capillary 3 with the external diameter of 0.5 to 0.9 mm. End faces 7 and 10 of the optical fibers 1 and 9 forming the Fabry-Perot cavity 6 with a gap of about 50 $\mu$m are placed inside the capillary 2 with the internal diameter of about 145 $\mu$m. The temperature stability of the sensor is $\Delta P/\Delta T \approx 0.001$ atm/° C.

28 Claims, 4 Drawing Sheets

FIBER-OPTIC PRESSURE SENSOR, VARIANTS AND METHOD FOR PRODUCING A RESILIENT MEMBRANE

FIELD OF THE INVENTION

The present invention relates to measurements of a hydrostatic and/or fast-changing pressure by optical means.

BACKGROUND OF THE INVENTION

A conventional fiber optic pressure sensor comprises a capillary with an optical fiber mounted in the capillary along its axis, and a flexible diaphragm attached to one end of the capillary [G. He, F. W. Cuomo, A. J. Zuckerwar. Diaphragm size and sensitivity for fiber optic pressure sensors. Proc.SPIE, 1991, vol.1584, p.p.152–156]. In the fiber optic sensor, a light signal for measuring the diaphragm deflection is supplied over one transmit multi-mode optical fiber with the core diameter of 50 $\mu$m and the cladding diameter of 120 $\mu$m, and the light reflected from the pressure-deflected diaphragm is collected by six similar multi-mode optical fibers arranged around the transmit optical fiber and forming an optical fiber bundle with a dense regular packing of optical fibers. A sensitive member of the sensor is a mylar metallized diaphragm 25.4 $\mu$m thick, this imparting high-frequency characteristics to the sensor.

A disadvantage of this sensor is that it does not exhibit high sensitivity due to the use of multi-mode optical fibers which prevent formation of an interferometer for measuring pressure effects, the sensor also suffers considerable light losses when collecting the light reflected by the diaphragm in the optical fiber cores which do not embrace closely the light field, and the portion of the output signal light depends crucially on the diaphragm size and the distance between the end of the optical fiber bundle and the diaphragm. The above pressure sensor is essentially the analog instrument with a low diaphragm displacement-to-optical signal conversion conductance.

The most pertinent prior art is a conventional optical fiber pressure sensor comprising a capillary in which a single-mode optical fiber is secured so that to move along the axis of the capillary [K. A. Murphy, M. F. Gunter, A. Wang, R. O. Claus, A. M. Vengsarkar. Extrinsic Fabry-Perot Optical Fiber Sensor. $8^{th}$ Optical Fiber Sensor Conf., Jan.29–31, 1992, Monterey, Calif. Conf. Proc., p.193–196]. This interferometer sensor is based on a low Q-factor Fabry-Perot interferometer formed by shattered end faces with the 4% Fresnel reflection of a single-mode optical fiber and an end face of a multi-mode optical fiber secured inside a glass capillary with an epoxy. The sensor provides sine wave interferometric response to the pressure changing the gap between the end faces (cavity length), and thereby exhibits a high pressure-to-cavity length (and to sensor output, respectively) conversion conductance.

A disadvantage of the above sensor is that it is impossible to sense a gas or liquid pressure to a high accuracy because the multi-mode optical fiber length acting as a movable mirror is fixed in the structure, and the task of connecting the multi-mode optical fiber to the diaphragm and arrangement of the diaphragm per se has not been solved.

SUMMARY OF THE INVENTION

The object of the present invention is to improve the sensitivity and to extend the dynamic range of measurements, as well to enhance the temperature and vibration stability of a pressure sensor.

The above object is attained owing to the fact that in the first variant of a pressure sensor, a movable mirror of the interferometer is a metallic or metallized flexible diaphragm with a diameter which considerably exceeds the external diameter of the optical fiber, this providing the possibility of precision displacement of the diaphragm in the center at a distance which is more than by the order of magnitude greater than the laser radiation wavelength, and extending the dynamic range of pressure measurements, and in the second variant of a pressure sensor, a flexible diaphragm is an organosilicon polymer with a short length of a multi-mode optical fiber pasted-in into the diaphragm, the multi-mode optical fiber length having a flat end face and acting as a movable mirror of the measuring interferometer. Furthermore, proposed is a method for fabricating a flexible diaphragm with a pasted-in optical fiber length for a highly sensitive sensor.

The inventions comprising variants of an apparatus and a method for fabricating a component of the apparatus are united by a single inventive idea.

BRIEF DESCRIPTION OF THE DRAWINGS

These and other features and advantages of the invention will be apparent from the following detailed description of its embodiments, taken together with accompanying drawings in which.

DETAILED DESCRIPTION OF PREFERRED EMBODIMENTS

Figure 1A:
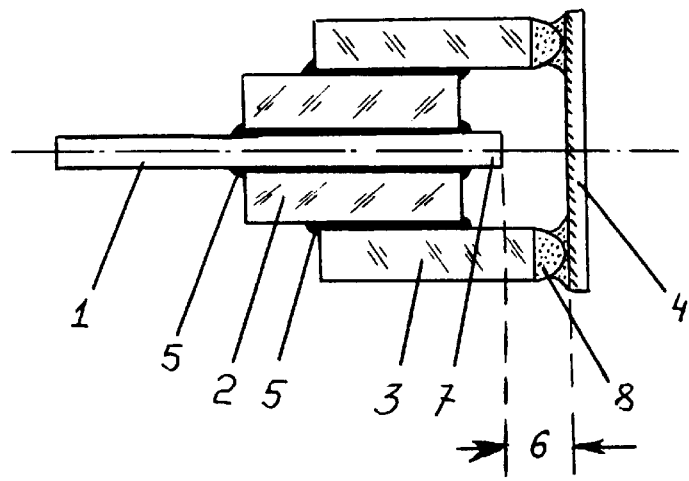
FIGS. 1a, 1b, and 1c depict a fiber optic pressure sensor.

Referring to the drawings, a fiber optic pressure sensor (FIG. 1) intended to measure high-frequency changes in pressure with small amplitudes of diaphragm displacements comprises a single-mode optical fiber 1, a capillary 2, a second capillary 3, a flexible diaphragm 4, epoxy splices 5 and a Fabry-Perot interferometer 6 formed by an end face 7 of the optical fiber 1 and the diaphragm 4.

Figure 2:
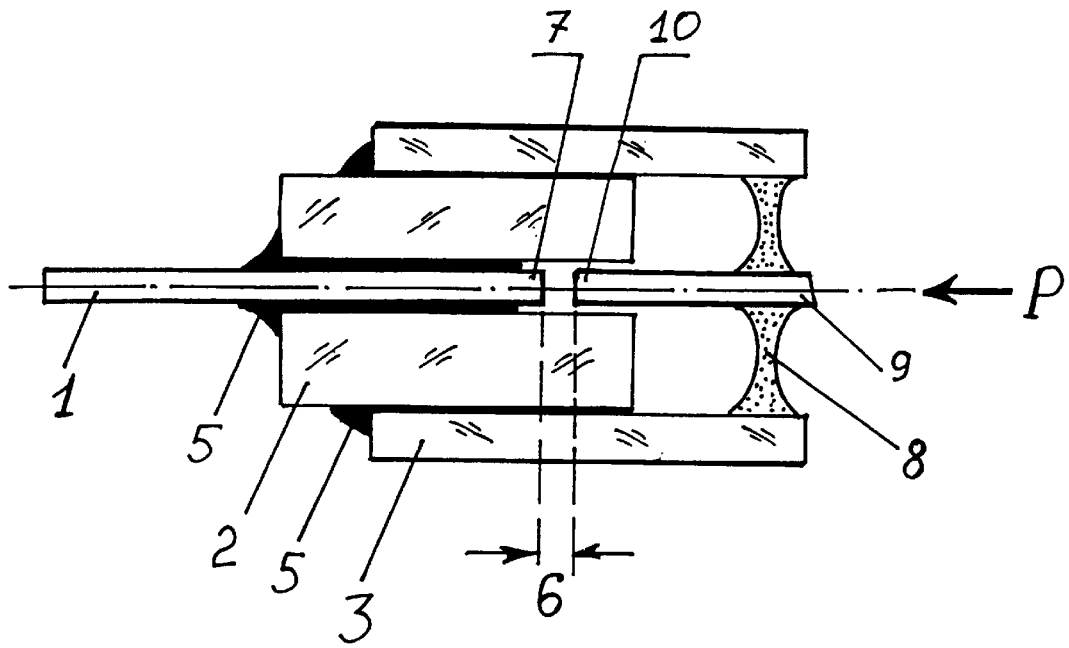
FIG. 2 depicts another embodiment of a fiber optic pressure sensor.

A fiber optic pressure sensor (FIG. 2) adapted to measure pressure with an enhanced sensitivity comprises a single-mode optical fiber 1, a capillary 2, a second capillary 3, a flexible diaphragm 8, a multi-mode optical fiber length 9 with a reflective end face 10, epoxy splices 5 and a Fabry-Perot interferometer 6 formed by end faces 7 and 10 of the optical fibers 1 and 9, respectively.

In the pressure sensor (FIG. 2), the internal diameter of the capillary 2 is 20–30 $\mu$m greater than the external diameter of the multi-mode optical fiber length 9, to allow a free longitudinal displacement of the optical fiber length 9. Pasting-in the other end of the optical fiber length 9 to the center of the flexible polymer membrane 8 axisymmetrically with the pasted-in end of the single-mode optical fiber 7 makes possible the interferometer 6 for precision measurement of changes in the cavity length and, consequently, pressure P.

A sensitive interference-protected optic fiber sensor designed in accordance with the invention for measuring a hydrostatic pressure within the range of from 0.5 to 1.5 atm has two measuring calibration scales: the analog scale with a sensitivity to about 0.01 atm, and the highly sensitive interferometer scale with the resolution and minimum sensitivity to about $10^{-4}$ atm. The use of the optical method of cavity length measurements and a laser source of probing light offers the improved sensitivity and enhances the temperature and vibration stability of the pressure sensor, as well as makes the sensor substantially completely immune to electromagnetic interference, the pressure measurement method being persistence-free.

A pressure sensor (FIG. 2) is a low Q-factor Fabry-Perot cavity/interferometer 6 at the end of a single-mode optical fiber 1 with the 4% Fresnel reflection from the silica glass/air interface. The other movable mirror of the cavity is an end face 10 of a short (1 to 3 mm) optical fiber length 9 having a small inertial mass and pasted-in to the center of a flexible membrane 8 with a diameter of 500–700 $\mu$m which tightly seals a small air volume (about 1 to 3 mm$^3$) inside the second capillary 3 with an external diameter of 0.5–0.9 mm. End faces 7 and 10 of the optical fibers 1 and 9 forming the Fabry-Perot cavity 6 are located with about 50 $\mu$m gap inside the capillary 2 with an internal diameter of 145–170 $\mu$m. This allows the movable optical fiber length 9, arranged strictly in the center, to move longitudinally in a free, substantially frictionless fashion, thereby providing constant geometry and magnitude of the interferometer 6 response under mechanical vibrations in the transverse direction. The small inertial mass of the material of the flexible membrane 8 and the pasted-in short optical fiber length 9 provide the great stability of the structure against the inertial forces caused by accelerations in the longitudinal direction, while in the transverse direction the acceleration forces do not disrupt the geometry of the interferometer 6 and do not substantially affect the pressure sensor operation. The high thermal resistance of the quartz capillaries 2 and 3 (the linear expansion factor smaller than $10^{-6}$ 1/° C.) and the small volume of air inside the capillaries lead to the enhanced stability of the sensor indications and calibrations under temperature changes. Calculations and experiments have demonstrated that the temperature stability value of the sensor in accordance with the invention is $\Delta P/\Delta T \approx 0.001$ atm/° C. The fact that the cavity of the interferometer 6 is formed by shattered end faces 7 and 10 of the optical fibers 1 and 9 with the 4% Fresnel reflection provides the reproducibility of the sine wave interferometric response of the sensor in operation at the end of the long optical fiber 1 when the interferometer signal is generated by combining (interfering) a single-mode radiation reflected from the end face 7 of the optical fiber 1 which is a trunk fiber, with a light of the same geometry, but singly reflected from the end face 10 of the movable optical fiber length 9 and inputted back to the optical fiber 1.

Figure 3:
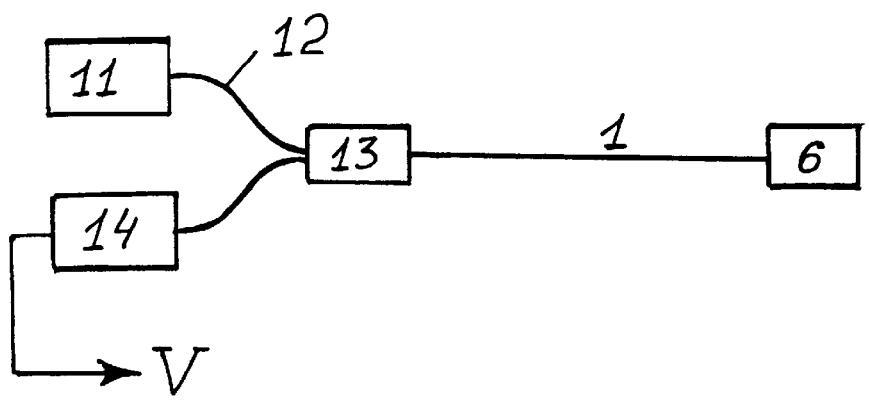
FIG. 3 is a block diagram of a pressure sensor measurement system.

As a pressure acts on the flexible membrane 8, its deflection value is (transferred) converted into a change in length L of the interferometer 6 cavity, the distance between the end faces 7 and 10 of the optical fibers 1 and 9, which is measured by a phase and/or amplitude of the sine wave response of the interferometer 6.

$$I=I_0(1+\sin\phi),$$

where beat-frequency waveform phase ($\phi=4\pi L/\lambda$, $\lambda$ is the operation wavelength of the laser source 11 in the measurement system (FIG. 3). The laser source 11 may be a laser module with an output fiber 12. FIG. 3 also shows a directional X or Y-type coupler 13 to input the light of the laser source 11 to the single-mode optical fiber 1 and output the light to a light detector 14, and the interferometer 6 of the pressure sensor. The pressure sensor measurement system (FIG. 3), in addition to the aforementioned components, comprises a laser excitation/modulation system (not shown), and, if required, an internal optical insulator, a pre-amplifier and a processing circuit (in simple case, a demodulator or a phase detector) with output to recording apparatuses (recorders, computers). The optical insulator may be necessary in the module since generally used in precision measurements are supermode lasers, the radiation spectrum of which may be distorted by the returned light due to the effects of the composite cavity. The sine waveform in the measurement system is generated in the light detector 14 where a photodiode (germanium, silicon or four-component photodiode) acts as a square-law detector of the total light field of two light fields reflected from the cavity faces.

Formula for the sensor interferometric response is obtained from the known Eiry function, while assuming a minor reflection factor value of the cavity mirrors, in this case R=0.04<<1.

The measured pressure P is proportional to cavity length change $\Delta L$, which, in turn, may be determined, at appropriate response calibration, from interferometric response phase change $\Delta\phi$:

$$P \sim \Delta L = \lambda \Delta \phi / 4\pi.$$

The above formula, showing a simple (linear) relationship between the cavity length and the phase change, may be used for absolute pressure measurements upon establishing the proportionality factor or apparatus function in the course of calibration. Phase measurements of sine waveforms are well developed today, and metrologically precise instruments can be designed, with the proviso that a sufficient isolation is provided against spurious and other cognate physical effects (temperature, etc.). The pressure sensor in accordance with the invention (FIG. 2) allows designing such instruments owing to the small size and weight, and the absence of metal in the structure. The combination of the aforementioned qualitative and quantitative characteristics of the pressure sensors (FIG. 1 and 2) in accordance with the invention is not met in conventional sensor designs. By modifying the flexibility, size and material of the membrane 8, one may design sensors with the structure in accordance with the invention, which will have properties optimized for each application, e.g. for the measured pressure range from about $10^{-4}$ atm to 10–100 atm and greater.

Owing to the fact that the original length of the measuring Fabry-Perot cavity in the sensor structure (FIG. 2) is small (about 50 $\mu$m), the radiation sources 11 may be both common semiconductor lasers from the range of 0.8–1.6 $\mu$m with the radiation bandwidth $\Delta\lambda=2-3$ nm (the radiation coherence length being no less than 1 mm), and ROS-lasers with a narrow generation spectrum (the bandwidth $<10^{-3}$ nm, the radiation coherence length of about 1 to 10 m). The latter lasers are preferable in those cases when strict requirements are imposed on the measured pressure resolution or when it is necessary to measure small absolute pressure values, which require precise maintenance and measurement of the sensor interference response phase in the measurement system.

Figure 4:
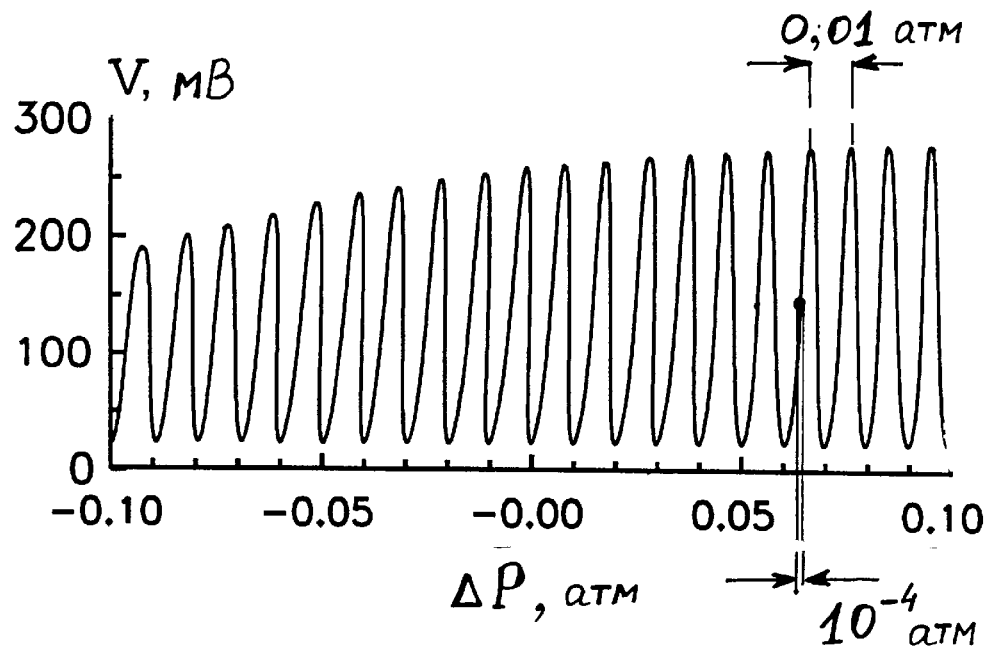
FIG. 4 is a view of a sensor interferometric response to pressure change $\Delta P$.
Figure 5:
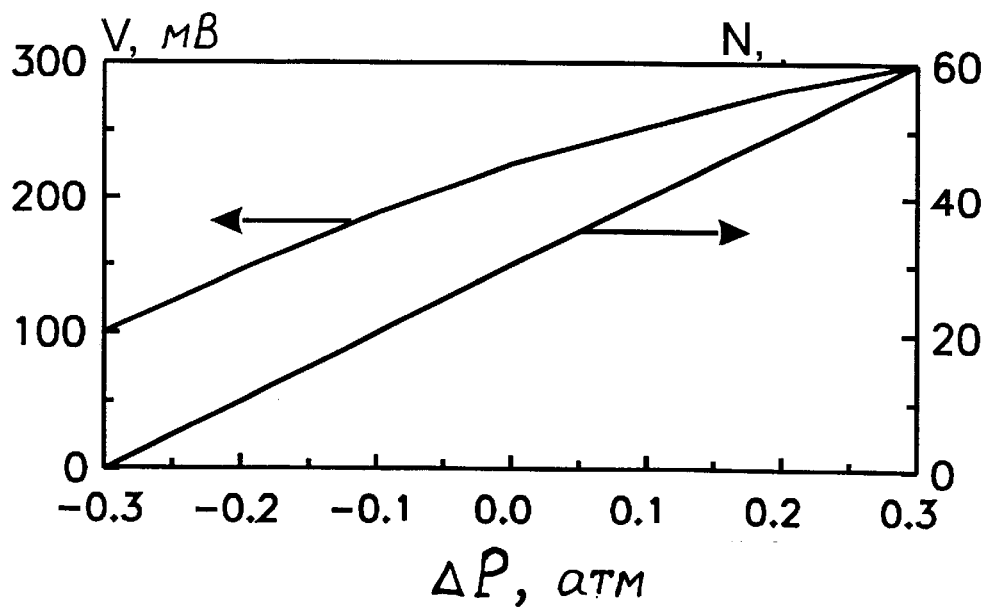
FIG. 5 is a view of calibration dependencies of the pressure sensor in analog and digital measurements.
Figure 6:
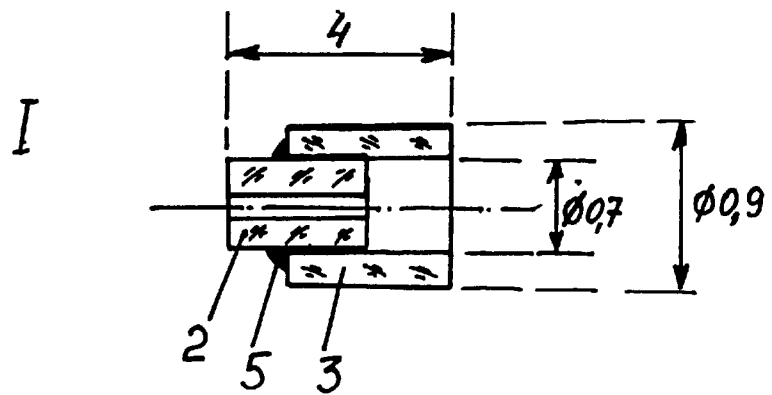
FIG. 6 is a view of basic stages of the pressure sensor fabrication process.
Figure 6:
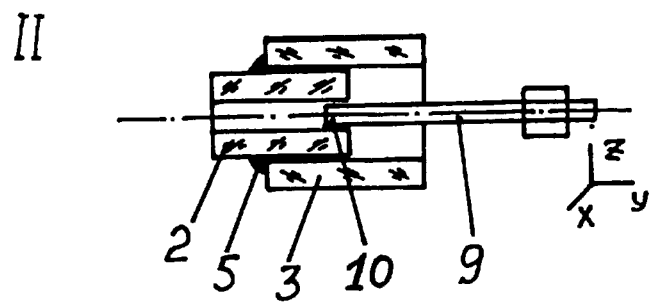
Figure 6:
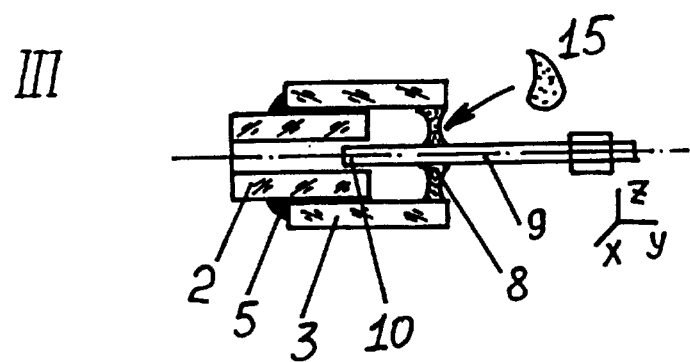
Figure 6:
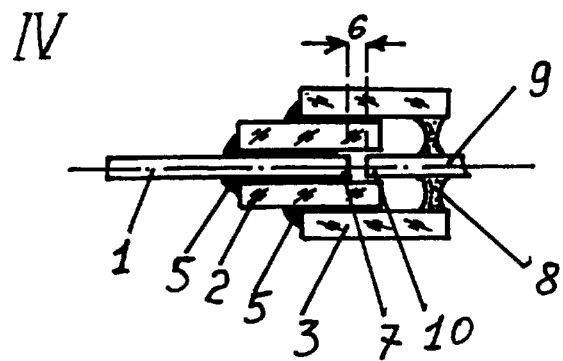

FIG. 4 shows a typical response of the pressure sensor (a response fragment is shown within ±0.1 atm of about 1 atm pressure). Within the measured pressure range of from 0.5 atm to 1.5 atm up to 60 signal beatings have been observed, the dependence of the period number N on the pressure being substantially linear throughout the pressure variation range of from 0.5 to 1.5 atm (FIG. 5). One period of signal variation at output of the light detector 14 corresponds to the change in the cavity length of the interferometer 6, more precisely 2ΔL, by the operating wavelength value, in this case λ=1.5 μm. Within this range of pressure changes, the complete bend of the membrane 8 was ΔL=60λ/2=30λ=45 μm. The N(ΔP) relationship linearity (FIG. 5) indicates that the membrane 8 operates within the elasticity limits, and no lags and hysteresis is observed in the indications. The measurement results and the sensor response are completely reproducible. The N(ΔP) relationship is in effect a calibrating relationship for this sensor. Pressure may be determined simply by counting a number of periods with resolution ΔP/ΔN≈1/60=0.017 atm per a period. When operating in the period number counting mode, the pressure sensor is a digital (or pseudo-digital) measurement instrument, which may be a significant merit in some applications.

FIG. 4 also shows that the envelope of the sensor sine wave response forms a second calibration curve in the analog form (shown in FIG. 5), the appearance of which is related with the relationship between the efficiency of input of the light reflected from the movable end face 10 of the optical fiber 9 and the distance between the end faces 7 and 10; with increase in pressure, the end faces 7 and 10 approach, the interferometer 7 cavity becomes shorter and the interference signal amplitude increases. The increase in the oscillation amplitude is evidence that the pressure increases, and this fact may be used to establish the pressure change sign when operating in digital mode. And lastly, the interferometer operating point may be selected at the center of the sine wave response (FIG. 4), in this case the sensor (FIG. 2) and the system (FIG. 3) may operate in the conditions of sensing minor pressure changes with a great conversion conductance. Experiments have shown that in this event a minimum pressure sensitivity/resolution at the level of $\Delta P_{min} \approx 10^{-4}$ atm can be easily achieved. This value depends on the noise behavior of the recording apparatus and it may be further increased by 1 to 2 orders of magnitude by appropriate selection of the processing method.

To fabricate the pressure sensor (FIG. 2), at the first stage capillaries 2 and 3 having a length of 2–4 mm or 3–5 mm are spliced with an epoxy at points 5 with a 1–2 mm misalignment along the optical axis. This is a preform of a sensor housing. At the second stage, an end face 10 of a multi-mode optical fiber 9 is inserted into the first capillary 2 at a depth of from 0.5 to 1 mm, the end face 10 being centered, using an XYZ three-axis table, in the radial direction so that the optical fiber 9 does not contact the internal walls of the capillary 2 and is on the capillary axis. At the third stage, a small amount of a polymerizing liquid 15 is added on the side of the capillary 3 end face where the optical fiber 9 is inserted, to wet both the fiber 9 and the capillary 3 end face. Immediately after that, excess of liquid 15 is removed using a dry fiber length or thin wire. Being drawn into the capillary 3 owing to good wettability of the silica glass of which the capillary 3 and the optical fiber 9 are made, the polymerizing liquid 15 forms meniscuses which automatically facilitate centering the optical fiber 9 inside the capillary 3 and form a flexible membrane 8. Upon polymerization of the liquid 15, the projecting end of the optical fiber 9 is cut. At the forth stage, an end face 7 of a single-mode optical fiber 1 with the 4% Fresnel reflection from the end face 7 is inserted into the capillary 2 at a depth of about 0.5 mm. Then, the optical fiber 1 is wetted with an epoxy at points 5 and inserted towards the multimode optical fiber 9. A gap of about 30 to 300 μm between the end faces 7 and 10 of the optical fibers 1 and 9 is established on the basis of the expected pressure measurement range and the flexibility of the membrane 8. The flexibility of the membrane 8 is varied within some limits by modifying its thickness in the fabrication process or by selecting an appropriate polymer. Reproducibility of the pressure sensor sensitivity (FIG. 2) is governed by the reproducibility of the diaphragm thickness which is substantially from 0.2 to 0.5 mm at the thinnest place of the meniscus. The feature of this pressure sensor, involving pasting-in a short multi-mode optical fiber length 9 to the membrane 8 ensures the conversion of its deflection into the length change of the optical cavity of the interferometer 6 inside the capillary 2 regardless of the shape of the membrane 8. Of importance is only the membrane flexibility and the axisymmetric shape which is provided by the surface tension forces while the polymer is still liquid.

Figures 1B, 1C:
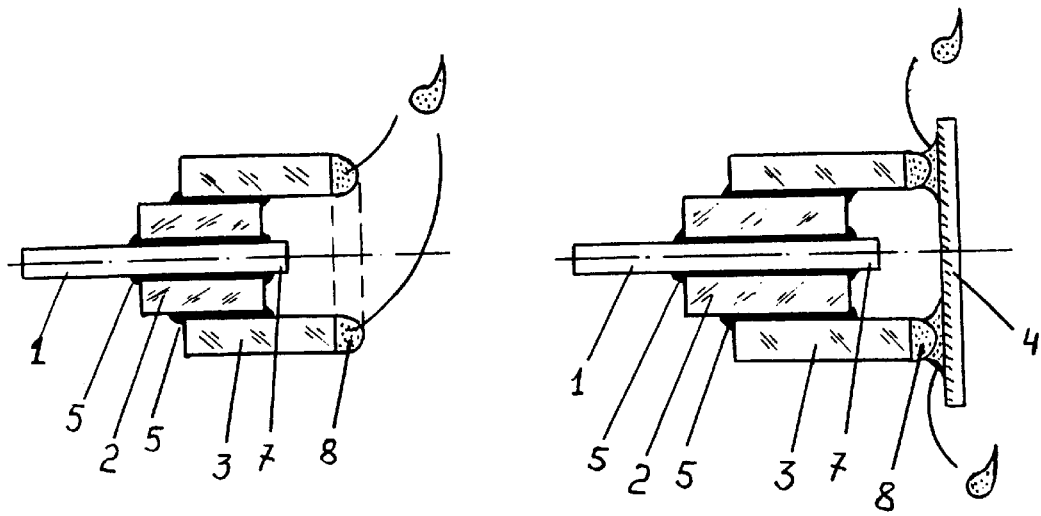

One more structural feature of the pressure sensor (FIG. 2) defines its speed of response. Owing to the fact that the movable optical fiber length 9 is inserted into the capillary 2 with the internal diameter which is only 20–30 μm greater than the external diameter (125 μm) of the optical fiber 9, air damps the movement of the optical fiber 9 when it moves fast (the pump effect), this limiting the speed of its displacement. Measurements of the relationship between the sensor interferometric response and the external pressure change frequency have shown that the sensor frequency range is limited within the frequencies of about 600–700 Hz. As a consequence, the sensor (FIG. 2) should be considered as a comparatively low-frequency one and adapted to measure hydrostatic or slowly changing pressures. These abilities of the sensor may be advantageous when smooth pressure changes are accompanied by vortexes and turbulence, as well as high-frequency acoustic signals, which should be sensed by the sensor (FIG. 1).

Experimental data (FIGS. 4 and 5) evidences that the cavity length axial change 2ΔL by the value λ=1.5 μm will result in one interferometric response variation period which corresponds to the measured pressure change ΔP by about 0.01 atm with the resolution at the beating period no worse than $\delta P=10^{-4}$ atm. From this data follows that the measurement laser system (FIG. 3) permits sensing the minimum absolute displacements of the membrane 8 and the end face 10 of the movable optical fiber 9 having a magnitude of about $\delta L = \lambda \delta P / \Delta P \approx 10$ nm.

To fabricate the pressure sensor (FIG. 1), a single-mode optical fiber 1 was fixed in the capillary 2 so that its end face 7 projected at about 1 mm, and a diaphragm 4 from aluminum foil 10 μm thick was attached to the capillary 3 end face with an epoxy to tightly seal the internal volume of 1–2 mm³. Owing to the high reflection factor of the aluminum foil (R≈0.95), the gap between the end face 7 of the single-mode optical fiber and the plane of the diaphragm 4 was increased to 100–200 μm in order to balance intensities of interfering signals at the light detector 14 (FIG. 3) and obtain a sine wave interferometric response without sacrifice to the optical efficiency of the sensor measurement system. By virtue of the great flexibility of the aluminum membrane, its small thickness and diameter (<1 mm), the pressure sensor (FIG. 1) exhibits high-frequency characteristics and is capable of sensing the pressure changes having the upper frequency as high as 100 kHz. The dynamic range of the sensor (FIG. 1) is, apparently, still wider that that of the second variant of the sensor (FIG. 2) due to the greater original gap between the end face 7 of the single-mode optical fiber 1 and the diaphragm 4.

Experimental data (FIGS. 4 and 5) has been obtained for the pressure sensor (FIG. 2) in which the silica glass capillary 3 had the length of 3 mm, the external diameter of 1 mm and the internal diameter of 0.7 mm. The silica glass capillary 2 had the length of 3 mm, the external diameter of 700 μm and the internal diameter of 145 μm. The capillary 2 was inserted into the second capillary 3 at a depth of from 1 to 2 mm. The external diameter of the optical fibers 1 and 9 was 125 μm. The optical fiber 9 was inserted into the capillary 2 at a depth of about 0.5 mm. The flexible membrane 8 was of an organosilicon polymer. Its thickness was about 0.3 to 0.5 mm in the narrow place. The distance between the end faces 7 and 10 of the optical fibers 1 and 9 was 50 μm. The optical fiber length 9 projected out from the membrane at 1 mm.

Used as a radiation source 11 in the measurement system (FIG. 3) was a laser module with an output fiber 12 based on a supermode semiconductor DFB-laser with the 1.5 μm wavelength and the radiation bandwidth of $\Delta\lambda \approx 10^{-4}$ nm. To input the light of the laser source 11 to the single-mode optical fiber 1 and to output the light to the light detector 14, the use was made of a directional Y-type coupler 13. The light detector was a germanium photodiode of PD-10G type.

INDUSTRIAL APPLICABILITY

The present invention is suitable for aerodynamic investigations of aircraft and small spacecraft, in robotics, including small force micro-clamps, in remote pressure monitoring (in wells, vessels, cylinders), in medicine and medical and biological investigations, hydroacoustics, security systems.

What is claimed is:

1. A fiber optic pressure sensor comprising a Fabry-Perot interferometer, one of reflective surfaces of the Fabry-Perot interferometer being an end face of a single-mode optical fiber which is mounted along the axis of a capillary and secured therein, characterized in that the sensor further comprises a second capillary and a flexible diaphragm attached to one end face of the second capillary, a surface of the diaphragm forming a second reflective surface of the Fabry-Perot interferometer, the capillary being mounted and secured along the axis of the second capillary on a side of the second end face of the second capillary.

2. The sensor according to claim 1 wherein said capillaries are of silica glass.

3. The sensor according to claim 1 wherein said flexible diaphragm is of a metal foil or a metallized polymer film.

4. The sensor according to claim 1 wherein a thickness of said flexible diaphragm is no less than 10 μm.

5. The sensor according to claim 1 wherein an internal diameter of the capillary is 0.8 to 4% greater than a diameter of the optical fiber.

6. The sensor according to claim 1 wherein a gap between the internal surface of the second capillary and the external surface of the capillary is from 5 to 20 μm.

7. The sensor according to claim 1 wherein said second capillary is inserted into the capillary at a depth of from 1 to 2 mm.

8. The sensor according to claim 1 wherein a length of said capillaries is from 2 to 4 mm.

9. The sensor according to claim 1 wherein an end of the optical fiber projects from the second capillary at a length from 0.5 to 1 mm.

10. The sensor according to claim 1 wherein a distance between the reflective surfaces of the Fabry-Perot interferometer is from 10 to 1000 μm.

11. The sensor according to claim 1 wherein the second capillary is secured in the capillary with an epoxy.

12. The sensor according to claim 1 wherein the optical fiber is secured in the capillary with an epoxy.

13. The sensor according to claim 1 wherein a length of said capillaries is from 3 to 5 mm.

14. A fiber optic pressure sensor comprising a Fabry-Perot interferometer, reflective surfaces of the Fabry-Perot interferometer being formed by end faces of optical fibers, one of the optical fibers being a single-mode optical fiber, ends of the optical fibers being arranged along an axis of a capillary, characterized in that the sensor further comprises a second capillary and a flexible diaphragm, a second optical fiber length is secured in the flexible membrane mounted on a side of one end face of the second capillary, the capillary being mounted and secured along an axis of the second capillary on a side of the second end face of the second capillary.

15. The sensor according to claim 14 wherein said capillaries are of silica glass.

16. The sensor according to claim 14 wherein said flexible diaphragm is of an organosilicon elastomer.

17. The sensor according to claim 14 wherein a thickness of the flexible diaphragm is from 100 to 400 μm.

18. The sensor according to claim 14 wherein an internal diameter of the capillary is from 10 to 40% greater than a diameter of the optical fiber.

19. The sensor according to claim 14 wherein a gap between an internal surface of the second capillary and an external surface of the capillary is from 5 to 20 μm.

20. The sensor according to claim 14 wherein said capillary is inserted into the second capillary at a depth of from 1 to 3 mm.

21. The sensor according to claim 14 wherein a length of said capillaries is from 2 to 4 mm.

22. The sensor according to claim 14 wherein an end of the first optical fiber is inserted into the capillary at a length from 300 to 500 mm.

23. The sensor according to claim 14 wherein an end of the second optical fiber is inserted into the capillary at a length from 250 to 400 mm.

24. The sensor according to claim 14 wherein a distance between the end faces of the optical fibers is from 30 to 100 μm.

25. The sensor according to claim 14 wherein a free volume inside the first capillary is filled with a gaseous substance.

26. The sensor according to claim 14 wherein said capillary is secured in the second capillary with an epoxy.

27. The sensor according to claim 14 wherein said first optical fiber is secured in the capillary with an epoxy.

28. The sensor according to claim 14 wherein a length of said capillaries is from 3 to 5 mm.

* * * * *

UNITED STATES PATENT AND TRADEMARK OFFICE
CERTIFICATE OF CORRECTION

| | | |
|---|---|---|
| PATENT NO. | : 6,539,136 B1 | Page 1 of 1 |
| DATED | : March 25, 2003 | |
| INVENTOR(S) | : Evgeny Mikhailovich Dianov et al. | |

It is certified that error appears in the above-identified patent and that said Letters Patent is hereby corrected as shown below:

<u>Title page,</u>
Item [73], Assignee, "Adademii" has been replaced with -- Akademii --.

Signed and Sealed this

Fifteenth Day of July, 2003

JAMES E. ROGAN
*Director of the United States Patent and Trademark Office*